Aug. 18, 1959  P. M. THOMAS  2,900,092
APPARATUS FOR CUBING BUILDING BLOCKS
Filed Aug. 6, 1956  10 Sheets-Sheet 1

Fig.1

INVENTOR.
PAUL M. THOMAS.
BY
Willard S. Grant
ATTORNEY.

Fig. 3

Aug. 18, 1959    P. M. THOMAS    2,900,092
APPARATUS FOR CUBING BUILDING BLOCKS

Filed Aug. 6, 1956    10 Sheets—Sheet 6

INVENTOR.
PAUL M. THOMAS.
BY
Willard S. Grume
ATTORNEY.

INVENTOR.
PAUL M. THOMAS.

United States Patent Office 2,900,092
Patented Aug. 18, 1959

2,900,092
APPARATUS FOR CUBING BUILDING BLOCKS
Paul M. Thomas, Phoenix, Ariz.
Application August 6, 1956, Serial No. 602,328
4 Claims. (Cl. 214—6)

This invention pertains to improvements in an apparatus for cubing building blocks and is particularly directed to a procedure of accumulating and consolidating blocks received from a concrete block forming machine and placing them in a particularly arranged pile or cubed stack for easy manipulation by a work-handling device.

This application is a continuation-in-part application of applicant's co-pending cases Ser. No. 335,187, now abandoned, and Ser. No. 520,997, now Patent No. 2,869,737.

One of the objects of this invention is to provide an improved apparatus for carrying out the method of taking a series of building blocks which have been cured and placed on the pallets received from a concrete block forming machine and to manipulate the blocks from the pallets to a final cubical stack having the lower row of the stack positioned end-wise so that the loading devices may be placed through the openings in the bottom row for manipulating the stack to any desired location.

Still another object of this invention is to provide an improved machine structure for handling a series of building blocks from the forming pallets and finally delivering them in a cubical stack capable of being manipulated for efficient handling and transportation.

Still another object of this invention is to provide an improved machine structure for handling a series of building blocks from their forming pallets and moving them through a series of pre-arranged sequentially actuated steps to come up with a cubical pile arrangement of the blocks in which the lower series of blocks are turned with their perforations horizontally and parallel and finally disposed on a horizontally moving conveyor with their various upper layers of blocks positioned with their openings vertically laced with securing cord to prevent dislodgment of the various layers during transportation of the cubical stack as it is handled by a fork lift from the conveyor to the transporting mediums.

It is a still further object of this invention to provide mechanism for efficiently removing formed cement blocks from their base pallets and to move the various groups of said blocks through a machine structure such that a cubical pile of pre-determined configuration and arrangement results, all of which is done by means of controlling the ultimate moving of the cubed pile by forklifting means inserted in horizontally disposed openings in the lower layers of the cubical stack and by ultimately depositing said completed stack on a conveyor in a position for a fork lift truck to pick up and transport the pile from the horizontally moving conveyor.

Further features and advantages of this invention will appear from a detailed description of the drawings in which.

As an example of one embodiment of this invention there is shown a building block cubing machine for handling building blocks usually made of cement or ceramic materials having the sides 18 and the ends 19, and the cored perforations 20. After the cement blocks are formed in the usual manner by automatic machinery of well known character forming no part of this invention, they are presented on pallets 21 which in turn are placed on drying and curing racks 22. These racks are usually removed from the curing ovens by suitable platform trucks and placed with the bottom ends 23 of their legs on the shuttle frame 24 comprising the side members 25 which are journaled on rollers 26 riding on the V-tracks 27 fixed to the floor 28 upon which the apparatus is mounted. A suitable drive motor 29 connected through suitable transmission means indicated generally at 30 to the rollers 26 provide means for moving or shuttling the frame 24 along the rails 27.

Figure 1:
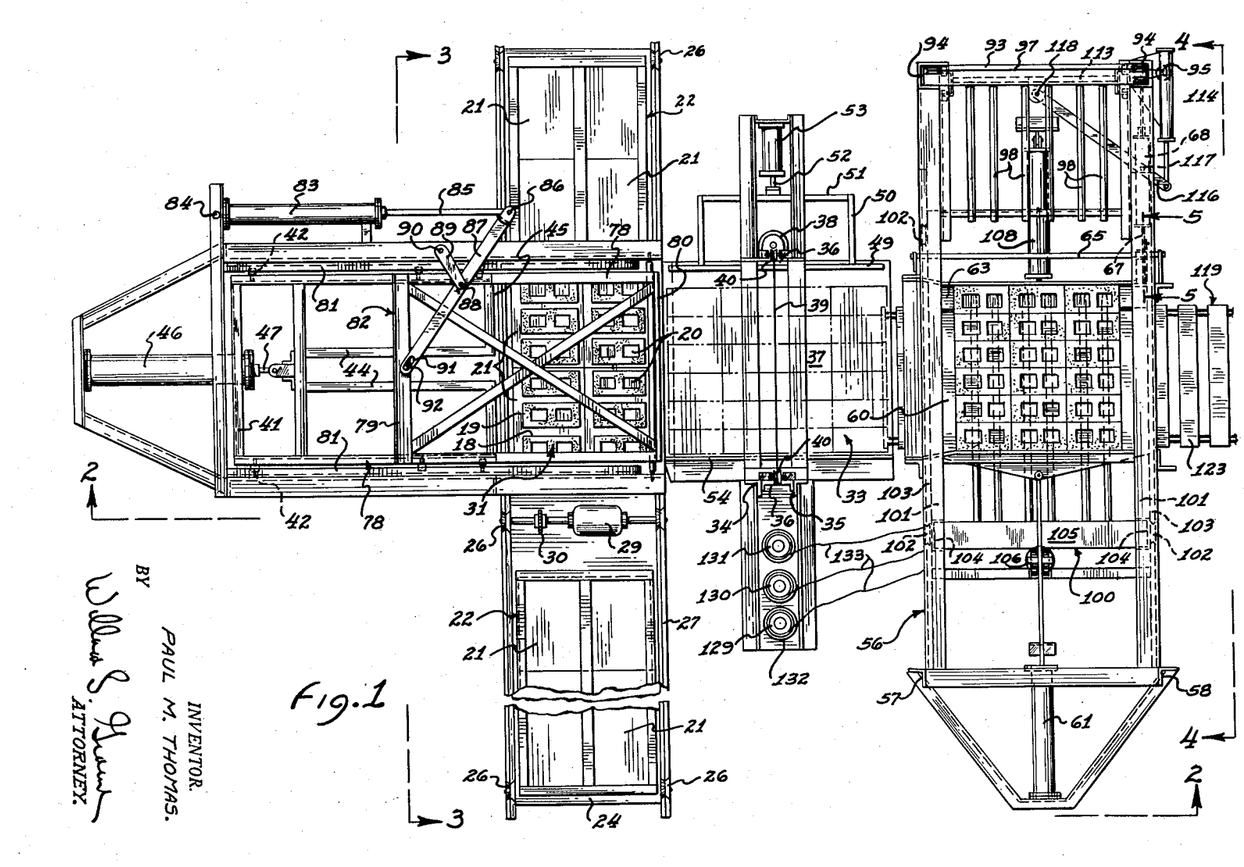
Fig. 1 is a plan view of apparatus incorporating the features of this invention.

In this particular arrangement of the drying and curing racks 22, a group of six blocks 31 are each carried on pallets 21 and the motor 29 is appropriately energized to bring a series of four pallets into the position shown in Fig. 1. At this time the blocks 31 have dried and hardened and are cured but are adhesively stuck to the top surfaces 32 of the pallets 21.

Adjacent one side of the tracks 27 and the racks 22 thereon is the transfer and cuddler unit indicated generally at 33 comprising a rigid frame 34 having guideways 35 in which is rigidly fixed the transfer platforms 37, one for each of the shelves of the racks 22. This entire assembly of the guide members 36 and transfer platform 37 may be raised or lowered by suitable means such as a fluid pressure cylinder 38, Fig. 1, having the usual piston rod connected to the operating cables 39 operating over the idler pulleys 40 in any suitable manner so that energization of the cylinder 38 raises or lowers the transfer and cuddler unit 33. With the unit in lowered position with the platforms 37 each aligned with the shelves in the racks 22, the blocks 31 would then be in aligned position to be shoved out on to the platforms 37. The shoving action for thus moving the blocks 31 off of the pallets 21 is provided by the pusher frame 41 guided on suitable rollers 42 operating in the guide members 43 rigidly attached to the machine frame structure. A series of pusher arms 44 are rigidly fixed to the pusher frame 41 and extend inwardly with abutment ends 45 adapted to be engaged with the ends 19 of the blocks 31 on the pallets 21. A suitable fluid pressure actuating cylinder 46 fixed to the machine frame and having an extendable piston rod 47 connected to actuate the pusher frame 41 serves to reciprocate the pusher arms 44.

Figure 2:
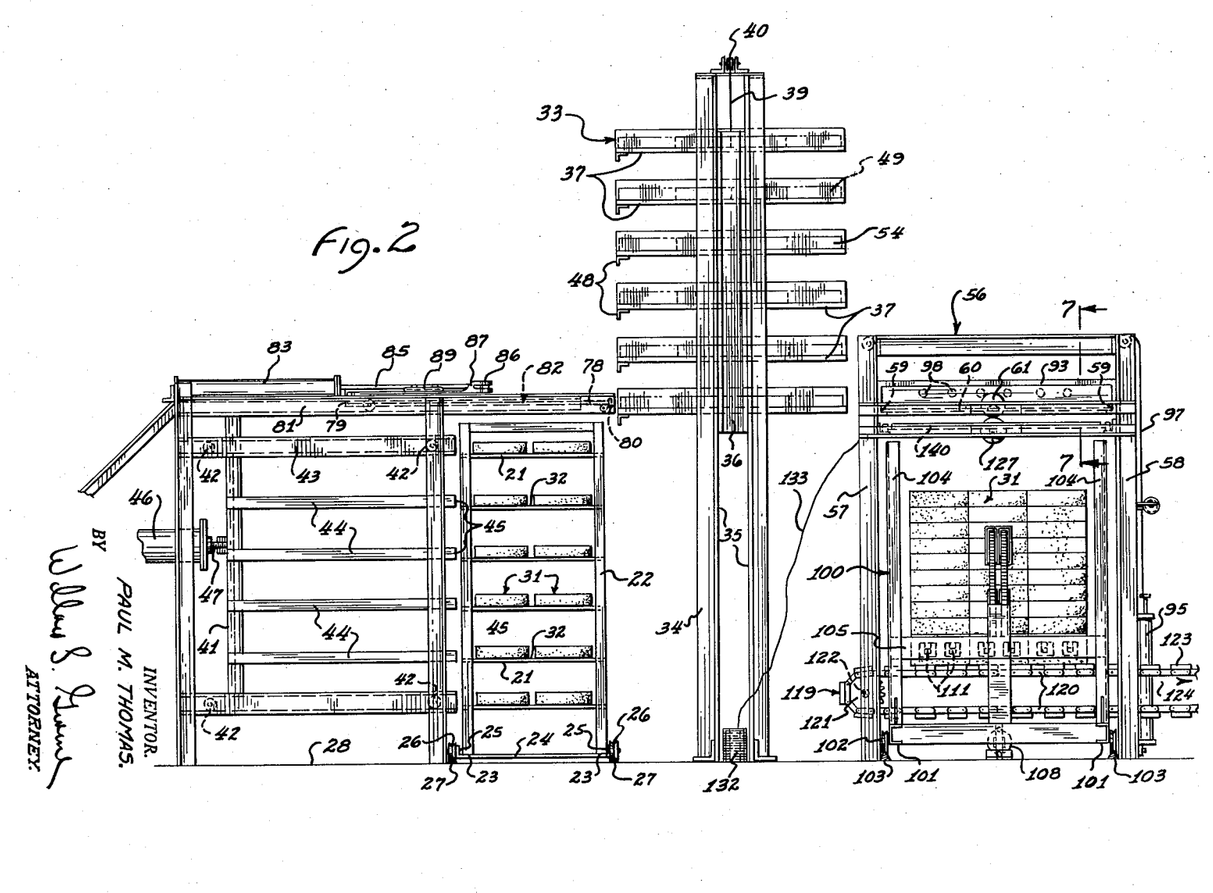
Fig. 2 is a right hand side elevation indicated by the line 2—2 in Fig. 1.
Figure 3:
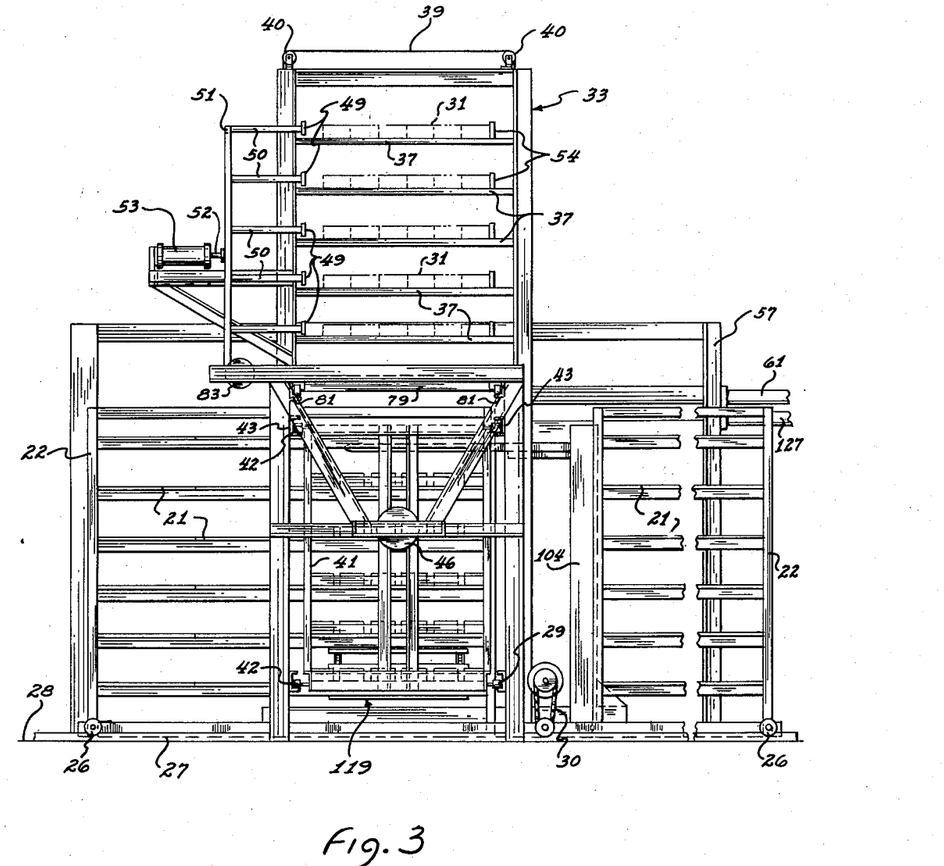
Fig. 3 is a front end elevation indicated by the line 3—3 in Fig. 1.

Because the blocks 31 are normally adhesively stuck to the pallets 21, the transfer and cuddler unit transfer platforms are not quite lowered to fully down position of exact horizontal alignment with the tops of the pallets 32 but they are held slightly upwardly so that when the pushers engage the ends 18 of the blocks on the pallets 21 the pallets will actually be partially slid off of the supporting shelves of the racks 22 and will engage the ends 48 of the platforms 37, Fig. 2, to thus arrest further sliding of the pallets out of the racks 22. Continued fluid pressure application appropriately in the cylinder 46 then causes the pusher arms 44 to break the cement blocks 40 loose from the top surface 32 of the pallets 21 so that then they are free to be pushed further to the right on to the platforms 37, the platforms 37 then dropping to fully lowered aligned position with the top surfaces 32 of the pallets for the further movement of the blocks off of the pallets and on to the platforms 37.

Thus, all of the platforms 37 are loaded with the blocks which have been slid off of the pallets 21, but under these circumstances the blocks are initially placed in sidewise spaced relationship on the platforms 37. It is then necessary to effect a cuddling operation which is performed by a series of cuddler bars 49 which are carried on a series of support arms 50 connected to a cross head 51 actuated by the piston rod 52 of an actuating cylinder 53, the entire assembly of the cylinder 53, cross head 51 and cuddler bars 49 being carried on the members 36 and the elevating platforms 37 in any suitable manner. The cuddler bars 49 slide on top of the platforms 37 and may be moved toward the fixed guide bar 54 secured to the top surface of each of the platforms 37 in alignment with the sides 18 of the blocks shown in Fig. 1 as they are removed from the pallets 21. Thus, when the fluid pressure cylinder 53 is energized to extend its piston rod 52 all of the blocks formerly widely spaced as they came off the pallets are now compacted together so all of their sides 18 are firmly in abutment contact. Thus, all of the blocks are cuddled into a compact mass both end-wise and side-wise on the platforms 37.

Figures 5, 6:
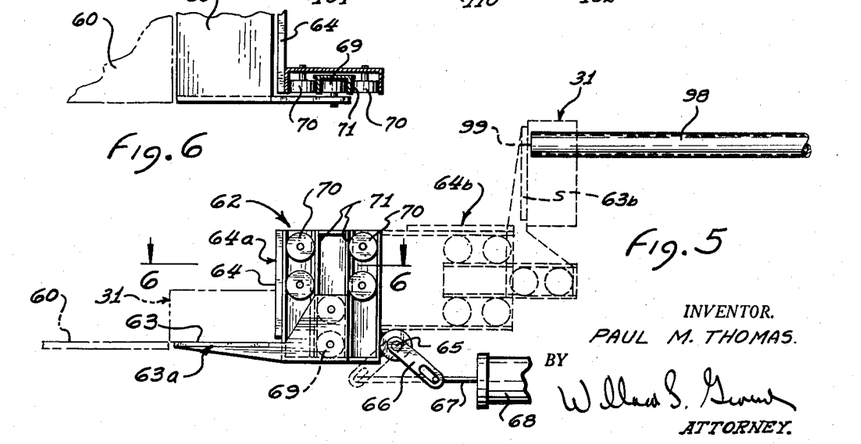
Fig. 5 is an enlarged fragmentary section on the line 5—5 of Fig. 1 showing the flipper mechanism for forming the lower upturned row of blocks.
Fig. 6 is an enlarged fragmentary view on the line 6—6 of Fig. 5.

On the opposite side of the transfer and cuddler unit 33 is located the cubing and tying unit 56 having a frame work rigidly fixed to the floor including the upright supports 57 and 58 to which is fixed the horizontal guide rails 59 in which is slidably mounted the trap door platform 60. This trap door platform is adapted to be reciprocated in the guideways 59 by suitable fluid pressure cylinder 61 rigidly mounted on the frame supports 57 and 58 in any suitable manner and having its piston rod suitably connected by operating mechanism to the trap door platform 60. There is also provided on the frame work 57—58 a rocking trough 62 having a block receiving surface 63 which may be swung into alignment horizontal and parallel to the top of the trap door platform 60 as shown best in Figs. 5 and 6. This rocking trough also has a block supporting surface 64 located at right angles to the block receiving surface 63. The rocking trough or flipper 62 having the block supporting surface member 64 is mounted on a suitable rockshaft 65 which is actuated by the arm 66 connected to a piston rod 67 of an actuating cylinder 68 so as to flip the member 62 from the pickup position 64a to the discharge position 64b or reverse. The member 63 having the block receiving surface is arranged to move across the surface 64 by a suitable mounting including the rollers 69 and 70 operating each side of a suitable guide member 71. Suitable cam means (not shown) operates in conjunction with the movement of the rockshaft 65 to cause the member 63 to move from position 63a to position 63b in response to positions 64a and 64b of the member 62.

On the opposite side of the transfer and cuddler unit 33 from the trap door platform 60 and the rocking trough 62 is the transfer pusher frame located in horizontal alignment with said members 60 and 62. This frame comprises the side members 78 interconnected by the rear cross member 79 and the abutment pusher cross member 80, the side members 78 sliding in suitable guideways 81 in the frame of the machine. The transfer pusher member indicated generally at 82 is reciprocated by a suitable fluid pressure cylinder 83 pivotally mounted on a suitable pin 84 at its rear end on the machine frame and having a piston rod 85 connected by a suitable pin 86 to the outer end of an actuating link 87 in turn pivotally connected by a pin 88 intermediate its ends to a link 89 pivotally mounted in turn at 90 on the machine frame, the other end of the actuating link having a slot 91 engaging over the operating pin 92 fixed in the rear cross member 79.

Thus, when any one of the transfer platforms 37 are brought into alignment with the transfer pusher member 82 and the trap door platform 60 and the surface 63 of the rocking trough 62 the fluid pressure cylinder may be energized to push the cuddled group of blocks of appropriate number on to the trap door platform 60 and the surface 63 of the trough. Any number of rows of blocks may be thus pushed off of the platforms 37 and by appropriately raising and lowering the transfer and cuddler unit 33 each of the platforms 37 may be selectively presented for unloading on to the trap door and rocking trough 60—62. It will be noted that only one row, Figs. 1 and 5, of blocks is presented on the surface 63 of the rocking trough 62 while a plurality or any desired number of additional rows of blocks are pushed out endwise on to the trap door platform 60 at the same time.

Figure 4:
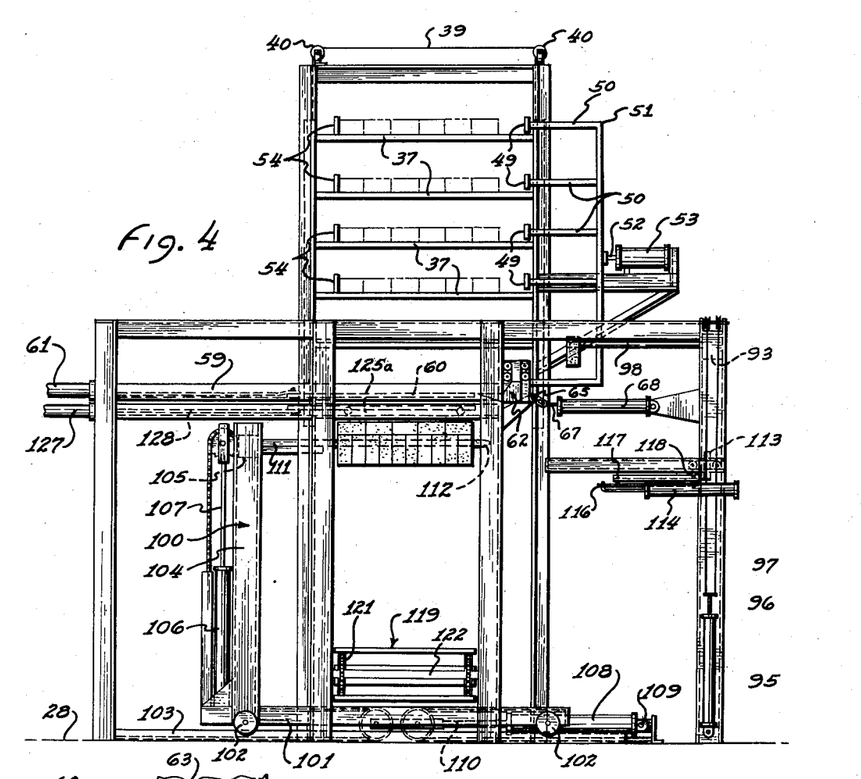
Fig. 4 is a rear end elevation partly in section on the line 4—4 of Fig. 1.

On the opposite side of the rocking trough 62 from the trap door 60 is located the cross head 93 of Fig. 1 which is vertically reciprocatable in suitable guideways 94 by a suitable fluid pressure cylinder 95 having its piston rod 96 connected through suitable cable means 97 to the cross head 93. A series of block receiving tines 98 are fixed to project horizontally outwardly from the cross head 93 to the position shown best in Figs. 4 and 5. These tines 98 are of tubular form having open ends 99 and the blocks are presented by the tipping up action of the rocking trough 62 and the traversing movement of the block receiving surface 63 when in tipped up position by the operation of the fluid pressure cylinder 68 whereupon the row of blocks on the surface 63 are turned up on edge 90 degrees to rest on the surface 64 of the rocking trough 62. Continuous repetition of this operation occurs until a whole series of blocks have been pushed on clear back substantially to the cross head 93 to complete a stack of now vertically positioned blocks hanging on the tines 98. In this manner, with the tines 98 and cross head in its upward position, all of the blocks are finally formed and stacked vertically to form the bottom or base row of the cube of blocks to be formed.

Associated with the trap door platform 60, the rocking trough 62, and the block receiving tines is the cubing cart unit indicated generally at 100 comprising the base frame 101 mounted on suitable rollers 102 operating on the rails or tracks 103 suitably rigidly fixed to the ground and machine frame. Upstanding supports 104 have suitable guideways for the vertical movement of a crosshead 105 actuated by a cylinder 106 having a piston rod 107 connected by appropriate means to the crosshead 105. A further fluid pressure cylinder 108 is fixed at its rear end 109 to the floor and has its piston rod 110 suitably connected to the base frame 101 to reciprocate the cubing cart 100 on the rails 103. Projecting outwardly from the crosshead 105 are the cube supporting tines 111 having reduced end 112 located in alignment with and adapted to enter the open ends of the tines 98 to form in effect continuous bars between the crossheads 93 and 105, Figs. 19 and 20, for transfer of the first row of tipped up blocks from the block receiving tines to the cube supporting tines. Mounted to slide horizontally on the frame of the machine is the stripper bar 113 actuated by a fluid pressure cylinder 114 having a piston rod 115 connected to a suitable lever arm 116 pivotally mounted at 117 on the machine frame and connected at 118 to the cross head 93. By appropriately energizing the cylinder 114 the stripper bar 113 may be reciprocated from the position shown in Fig. 19 to the position shown in Fig. 20 to shuttle the first row of upturned blocks on to the tines 111 of the cubing cart 100, or bring the stripper bar back to retracted position shown in Fig. 19.

Figure 18:
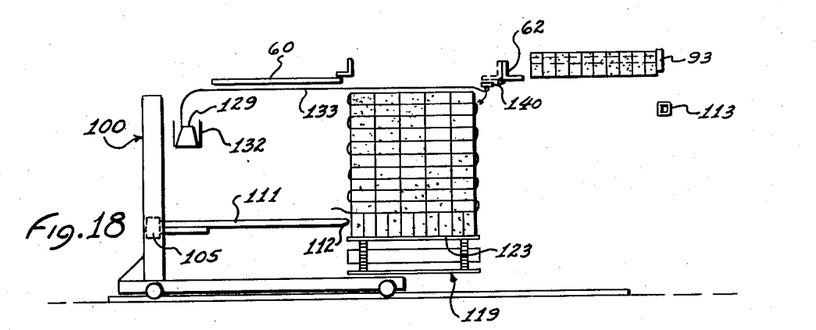
Fig. 18 is a diagram showing the withdrawal of the tines of the cube supporting lift from the cube after its deposition on the conveyor.

Located below the cube supporting tines 111 of the cubing cart 100 is the final discharge conveyor 119 comprising the endless chains 120 operating over suitable sprockets 121 fixed on the shaft 122 journaled on the frame of the machine, suitable motive power means (not shown) being utilized to actuate the work engaging members 123 of the conveyor in the direction indicated by the arrow 124 so as to remove the completed cube from the machine, Figs. 18 and 19. The cubes may then be removed from the conveyor as by means of a fork lift truck 125 having the fork tines 126 entering the openings of the first row of upturned blocks of the cubical stack.

In order to increase the stability of the cubical stack of blocks for transporting and handling there has been provided an arrangement operating in conjunction with the aforementioned procedure for threading cords or twine in between the various layers of blocks so that they will not normally jar loose from their stack and drop out of the pile and otherwise cause deterioration of the stack and damage to the blocks. This apparatus comprises a twine shuttle frame 125a, shown best in Figs. 7 and 8, which moves horizontally in suitable guideways 126a fixed to the frame of the device. The frame is connected to be actuated by any suitable power means such, for example, as the fluid pressure cylinder 127 rigidly mounted on the machine frame and having its piston rod 128 appropriately connected to the frame 125a. A plurality of balls of twine 129, 130 and 131 are carried in twine holder cans 132 fixed to the machine frame and the twine unwinds from each of the balls in the lines 133 and pass up through the eyelets 134 fixed slightly below and to one side of the shuttle frame 125a on the machine frame. From the eyelets 134 fixed to the machine frame the lines 133 go through the guide eyelet 135 and then through the guide eyelet 136 both fixed to the twine shuttle frame 125a along one side thereof and offset outwardly from the outer edge of the cube of blocks to be formed. The lines 133 then each individually pass through the respective threading eyelets 137, 138 and 139 fixed on the front rail 140 of the twine shuttle frame 125a.

Figures 7, 8:
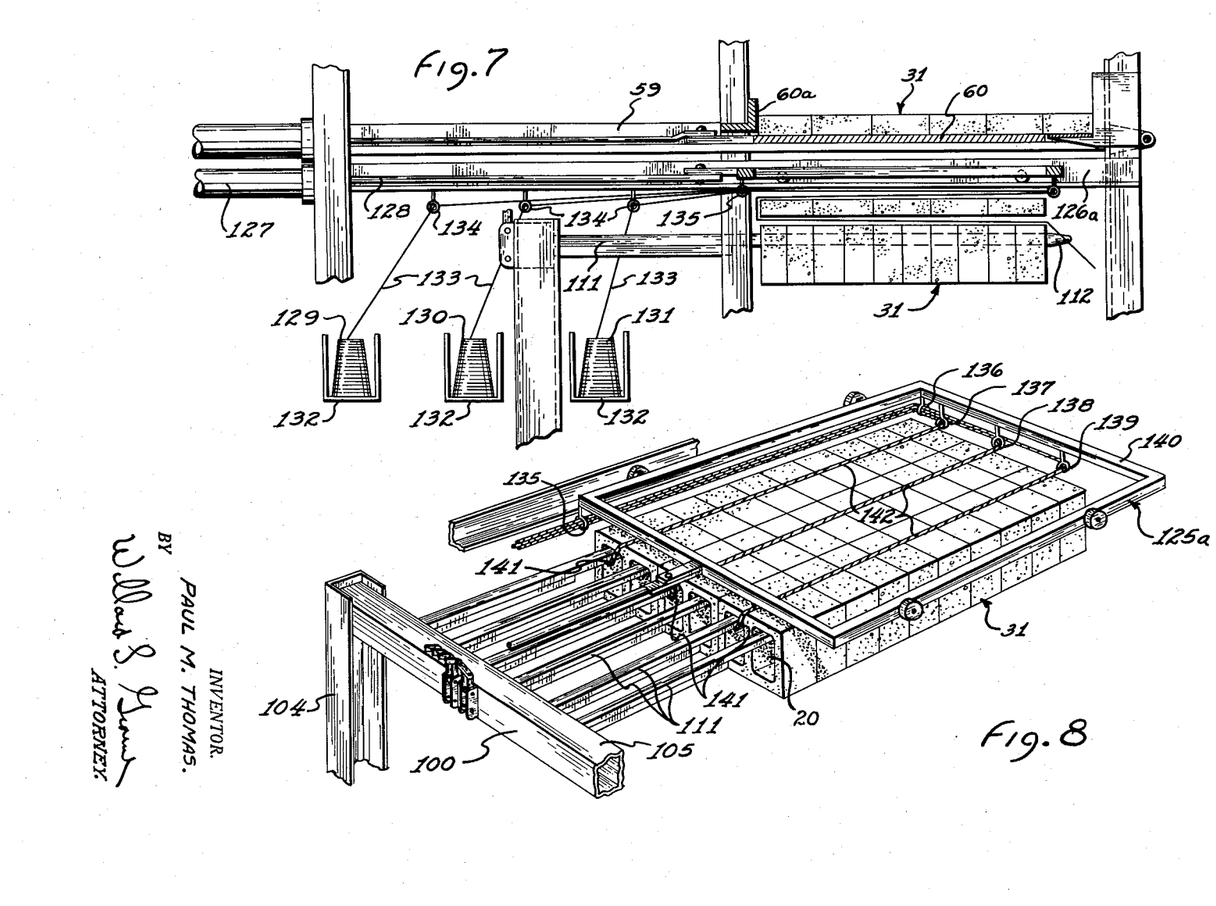
Fig. 7 is an enlarged fragmentary section on the line 7—7 of Fig. 2 particularly showing the cord weaving apparatus.
Fig. 8 is a perspective view of the cord weaving frame and cube supporting tines of the fork lift device.

These three threading eyelets 137, 138 and 139 are arranged to travel across the top of the blocks from one end to the other as best shown in Fig. 8 upon actuation of the cylinder 127.

Figure 19:
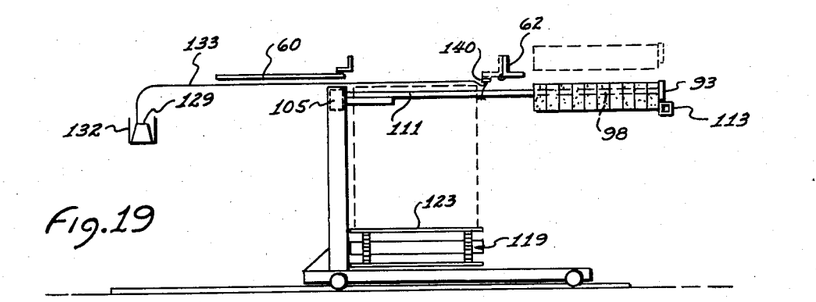
Fig. 19 is a diagram showing the inner-positioning of the cube supporting truck tines with the tines of the first row forming mechanism.
Figure 21:
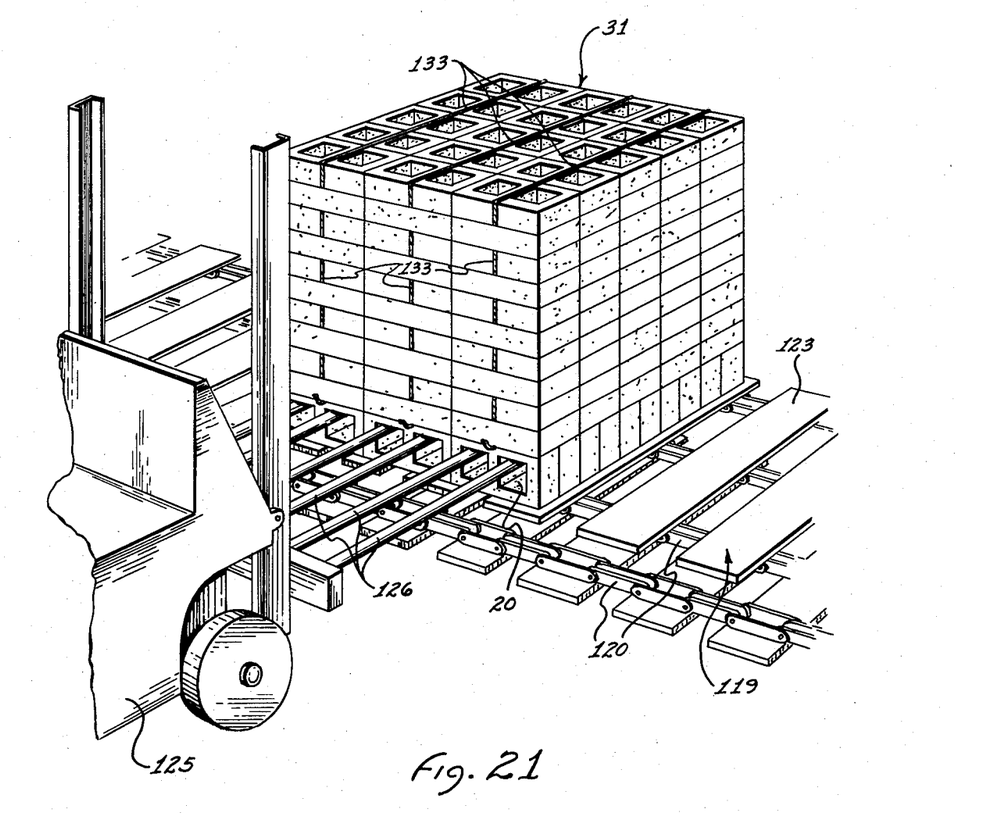
Fig. 21 is a perspective view showing the method of removing the cubed stacks of blocks from the conveyor belt with a fork lift truck.

Initially, with a stack of vertically disposed blocks on the tines 111 of the cubing cart 100 as shown in Fig. 8, and with the ends 141 of the twine cords held by suitable means such as by the previous cube that has just been formed and moved out by the conveyor such as shown in Fig. 19, the shuttle moves from left to right, Figs. 7 and 8, stretching the cords at 142 by moving from right to left with the cord being unwrapped from the balls 129, 130 and 131 and moving out through the various eyelets recited. After this movement of the shuttle has taken place, the trap door 60 is then withdrawn to the left, Fig. 15, and a first set of blocks are deposited on top of the strings and the blocks immediately thereunder. The trap door then closes and receives another load of blocks and during this time the shuttle 125a then moves to the right, Figs. 7 and 8, again stretching another series of lines 142 across the top of the blocks just deposited. Then the trap door is again opened and another series of blocks deposited thereon, the trap door closes to receive the next load and then again the shuttle shifts to the opposite direction to again lace the twine over the top of the set of blocks just deposited. This operation continues until the twine has then been interwrapped between the various layers to come up with the cube with the twine interlaced between the different layers of blocks as best shown in Fig. 21, the twine thus serving as a strengthening medium to tie all of the blocks together and prevent them from shaking loose during transportation and handling.

Figure 9:
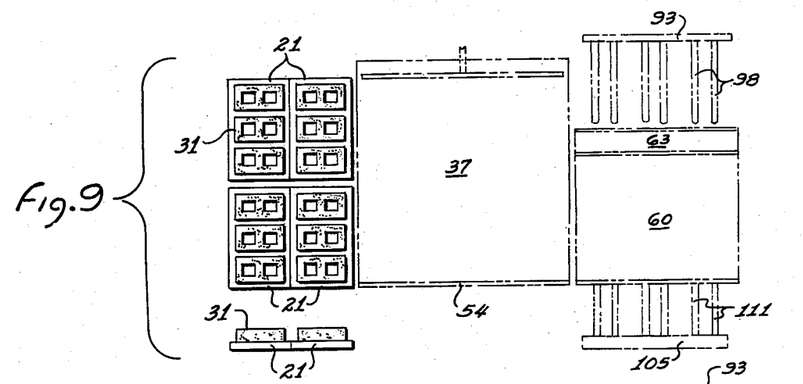
Fig. 9 is a diagrammatic view showing the initial presentation of the blocks on their forming pallets on the pallet racks preparatory to being stacked and cubed by the machine.
Figure 10:
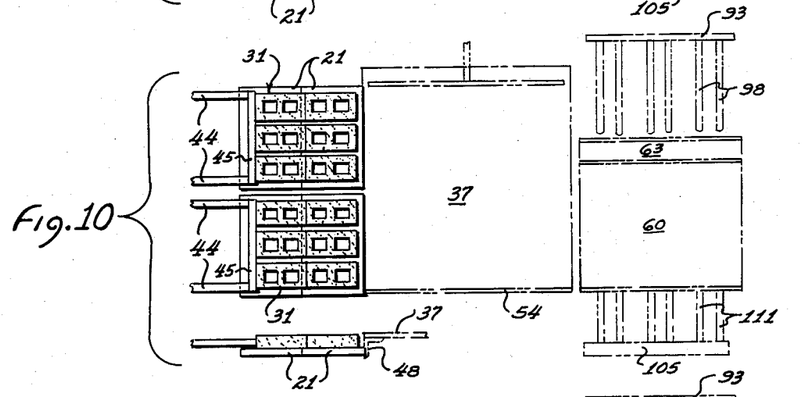
Fig. 10 is a diagrammatic view showing the initial breaking loose and removal of the building blocks from the pallets.
Figure 11:
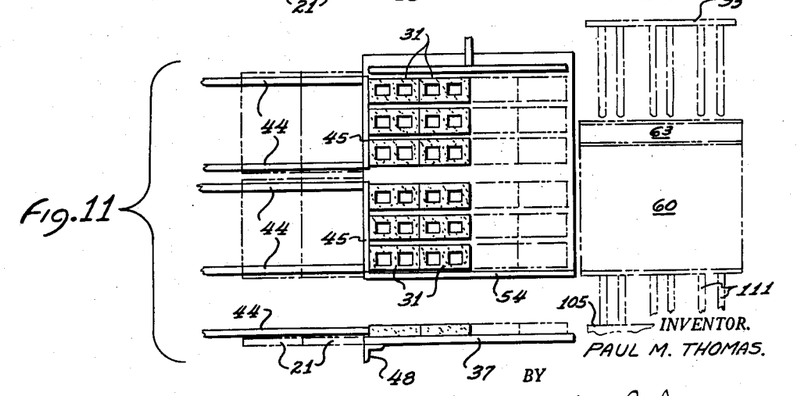
Fig. 11 is a diagrammatic view showing the building blocks being pushed into position for cuddling.

In order to summarize the basic principles of the operation of this apparatus, attention is directed to Figs. 9 through 20 inclusive. In Fig. 9 is shown the initial presentation of the building blocks 31 adhesively stuck to the pallets 21. The next step is that shown in Fig. 10 wherein the pusher arms 44 engage the blocks 31 and breaks them loose from the pallets 21, the pallets initially engaging the abutment ends 48 of the transfer platforms 37 to affect this breaking loose of the blocks from the pallets. The platforms 37 then are lowered to exact level relationship with the top of the pallets 21 and the pusher arms 44 push the blocks over on to the transfer platform 37 as shown in Fig. 11.

Figure 12:
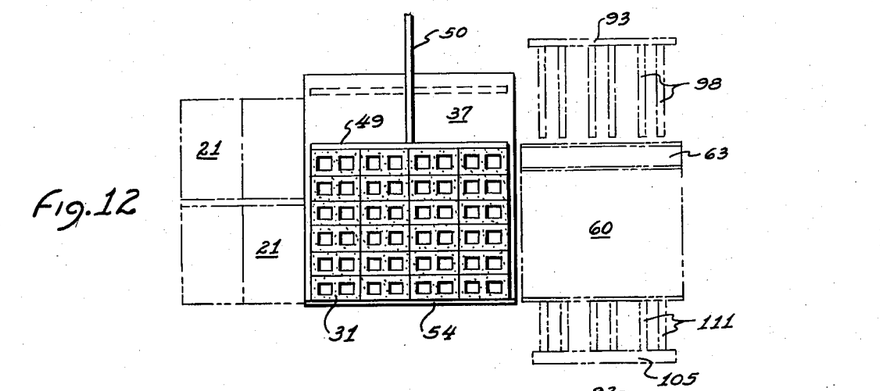
Fig. 12 is a view showing the cuddling or compacting of the building blocks.

In Fig. 12 the cuddling operation then takes place wherein the cuddler bars 49 compress the blocks against the fixed guide bar 54 to take out all slack between the blocks and compact them sidewise on the platforms 37.

Figure 13:
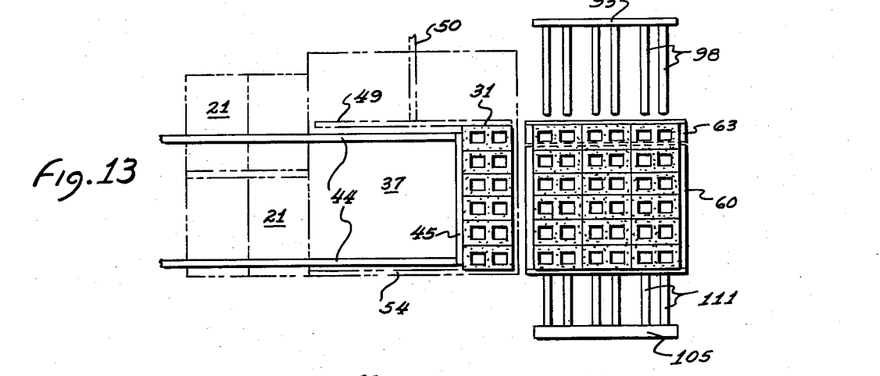
Fig. 13 is a diagrammatic view showing the cuddled blocks moved to position on the trap door and rocking trough or flipper.

In Fig. 13 the transfer pusher member then comes into operation and pushes the cuddled or compacted blocks out on to the trap door 60 and the trough surface 63 adjacent the trap door scraper bar 60a, Fig. 7.

Figure 14:
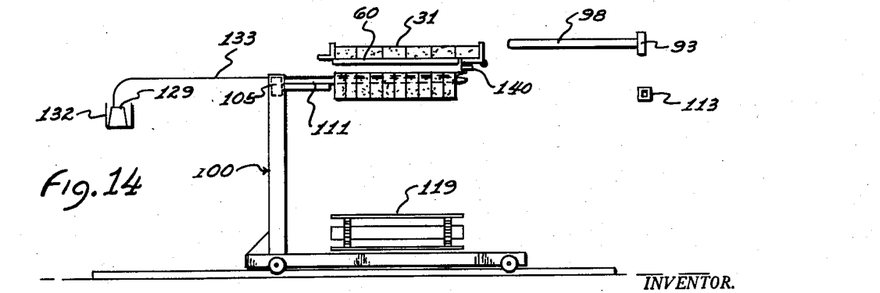
Fig. 14 is a diagram showing the initial beginning of the cube formation.
Figure 20:
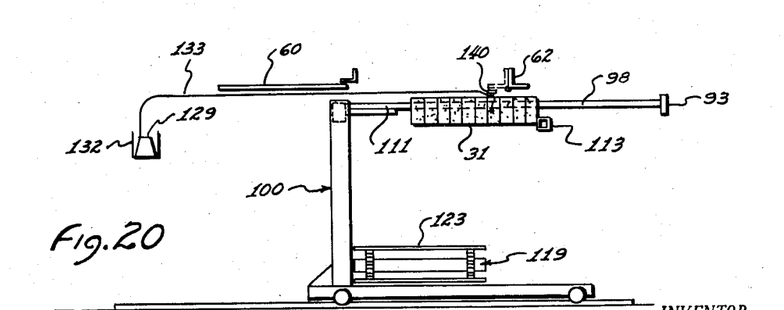
Fig. 20 is a diagram showing the movement of the upturned first row layer of blocks on to the tines of the cube supporting unit.

Fig. 14 shows the blocks thus presented out on the trap door and rocking trough, with cubing cart 100 having its cube supporting tines 111 raised to position with the first bottom row of vertically disposed building blocks on the tines 111 as described in connection with Figs. 19 and 20. The shuttle 140 then brings the first set of twine over the top of these vertically supported blocks after which the trap door 60 opens and drops its set of blocks on top of the twine and the vertically disposed blocks while at the same time the rocking trough 62 presents a set of blocks new in vertical position on the tines 111.

Figure 15:
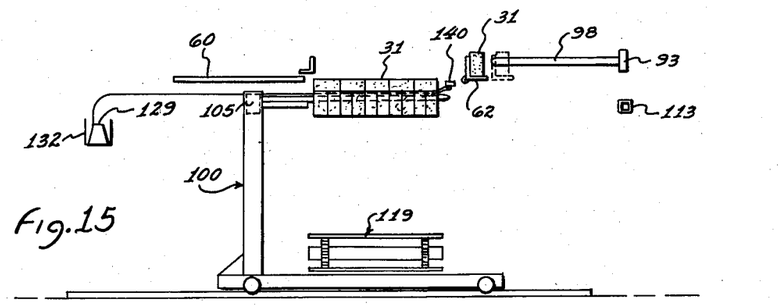
Fig. 15 is a diagram showing the position of the second row of blocks on the cubical stack.

Fig. 15 shows the condition of the blocks having been dropped on top of the strings and on top of the vertically disposed blocks on the cubing car while the rocking trough 62 has presented its blocks to the ends of the tines 98, preferably the strings being held by the stack of blocks just released from under the trap door arrangement.

Figure 16:
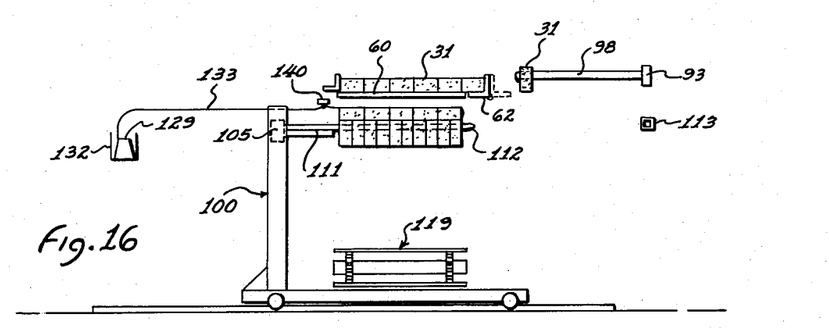
Fig. 16 is a further diagram showing the completion of the intertwining of the cord over the second row of blocks.

In Fig. 16 is shown the next operation wherein the shuttle then moves again to the left to bring more string over the top of the layer just deposited while a new set of blocks is pushed off the transfer platform on to the trap door and rocking trough which have now been returned to the normal receiving position. This operation continues with the tines 111 under the trap door constantly lowering with each stack of blocks presented thereon and it is important to note that during this continuous lowering operation the ends of the string finally break from the previously completed cube on the conveyor as the cube being formed sinks lower and lower so as to automatically separate the twine from the previously completed cube.

Figure 17:
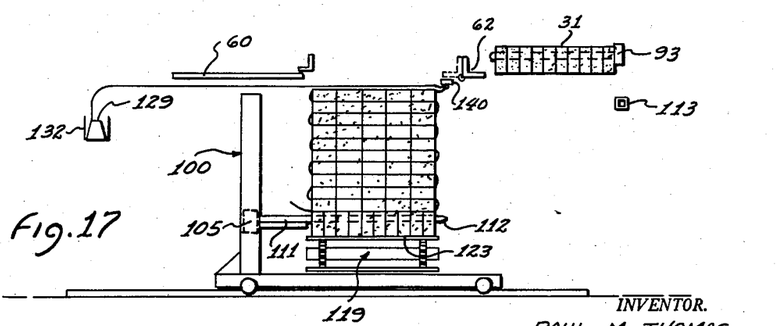
Fig. 17 is a diagram showing the final stage of completing the cubing operation on the stack of blocks and the deposition of the cube on the discharge conveyor.

Finally, as the cubical stack comes to rest on the work engaging members 123 of the conveyor, the tines 111 have moved down slightly in the holes 20 in the first row of vertical blocks as shown in Fig. 17. Cylinder 108 is then energized to actuate the cubing cart 100 to the left as shown in Fig. 18, to withdraw the tines 111 from out of the completed cube of blocks resting on the conveyor.

The conveyor chains 120 are then suitably energized to move the completed cube out of the machine, ready to be picked up by the fork lift truck 125 shown in Fig. 21. The cubing cart 100 then returns to extreme right position shown in Fig. 19 with the tines 111 raised to aligned position with the tines 98 of the crosshead 93 in lowered position, bringing the vertically gathered group of blocks on the tines 98 in position to be engaged by the stripper bar 113. The stripper bar is then energized to slide the blocks for the tines 98 on to the tines 111 of the cubing cart, Fig. 20. Finally the cubing cart 100 moves partially to the left, Fig. 14, to repeat the described cubing cycle. As the completed cube is moved out of the machine by the conveyor, Fig. 19, further string is stretched out from the balls of twine sufficiently so that the shuttle can then start intertwining the cord in the next stack as described.

It is to be understood that all of the various actuating elements for the machine energized by the fluid pressure cylinders or any other suitable means may be interlocked and interconnected in a substantially automatic cycle, the details of which arrangement form no specific part of this invention. It is important to note the sequential procedure beginning with the blocks adhesively stuck to the pallets coming from the curing and drying racks to the end.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a cubing machine for cored hole building blocks, a frame, a trap door horizontally reciprocatable on said frame, a scraper bar fixed on said frame above said trap door to hold blocks on said trap door against horizontal displacement when said trap door is withdrawn, a rocking trough adjacent an edge of said trap door when in block receiving position, means on said frame for loading horizontally disposed blocks on said trap door and said rocking trough, a series of horizontally disposed block receiving tines, means on said frame for actuating said rocking trough to turn up a row of blocks and to present said upturned blocks supported by their cored holes on said block receiving tines, and means on said frame under said trap door when in loading position to receive blocks from said trap door when said trap door moves to retracted position.

2. In a cubing machine as set forth in claim 1 wherein said last mentioned means includes a cubing cart horizontally movable relative to said frame, a series of horizontally disposed cube supporting tines on said cart arranged in laterally spaced alignment with said block supporting tines, means for vertically reciprocating said tube supporting tines on said cart, means for vertically moving said block supporting tines to bring both of said series of tines into axial alignment, and a further stripper bar movable on said frame to engage and slide said upturned blocks accumulated on said block supporting tines onto said cube supporting tines.

3. In a cubing machine as set forth in claim 1 wherein said means on said frame for loading horizontally disposed blocks on said trap door and said rocking trough includes means for positioning a pallet rack on said frame, a transfer and compacting unit on said frame located between said trap door and rocking trough and a pallet rack positioned on said frame including vertically reciprocatable transfer platforms adapted to receive blocks from pallets in said pallet racks, and compacting devices on said transfer and compacting unit connected with each platform, pusher arms on said frame actuable to push blocks from pallets on said pallet rack onto said transfer and compacting unit, and further pusher members on said frame adapted to move blocks from said transfer unit onto said trap door and rocking trough.

4. In a cubing machine as set forth in claim 2 wherein there is provided a discharge conveyor having a load carrying surface movable horizontally relative to said frame adapted to engage the bottom surface of the bottom row of upturned blocks of the completed cube as said cube carrying tines lower said cube to cube carrying tine releasing position to permit horizontal movement of said cart away from said conveyor to withdraw said cube carrying tines from the cover of said upturned bottom row of said blocks.

References Cited in the file of this patent

UNITED STATES PATENTS

| 2,663,443 | Schenkelberger | Dec. 22, 1953 |
| 2,699,264 | Bruce et al. | Jan. 11, 1955 |